(12) United States Patent
Hack et al.

(10) Patent No.: US 10,592,131 B2
(45) Date of Patent: *Mar. 17, 2020

(54) RESTORABLE MEMORY ALLOCATOR

(71) Applicant: International Business Machines Corporation, Armonk, NY (US)

(72) Inventors: Michel Hack, Cortlandt Manor, NY (US); Xiaoqiao Meng, Millwood, NY (US); Jian Tan, Santa Clara, CA (US); Yandong Wang, Elmsford, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/795,815

(22) Filed: Oct. 27, 2017

(65) Prior Publication Data

US 2018/0052627 A1   Feb. 22, 2018

Related U.S. Application Data

(63) Continuation of application No. 14/980,411, filed on Dec. 28, 2015, now Pat. No. 9,880,761.

(51) Int. Cl.
| | |
|---|---|
| *G06F 12/00* | (2006.01) |
| *G06F 3/06* | (2006.01) |
| *G06F 12/02* | (2006.01) |

(52) U.S. Cl.
CPC ......... *G06F 3/0619* (2013.01); *G06F 3/065* (2013.01); *G06F 3/0631* (2013.01); *G06F 3/0685* (2013.01); *G06F 12/0253* (2013.01)

(58) Field of Classification Search
None
See application file for complete search history.

(56) References Cited

U.S. PATENT DOCUMENTS

| | | |
|---|---|---|
| 6,574,749 B1 | 6/2003 | Parsons |
| 7,107,411 B2 | 9/2006 | Burton et al. |

(Continued)

FOREIGN PATENT DOCUMENTS

EP   0814405   12/1997

OTHER PUBLICATIONS

Wang, Y., et al., "Preemptive ReduceTask Scheduling for Fair and Fast Job Completion", Tenth International Conference on Autonomic Computing, Jun. 26-28, 2013, pp. 1-11.

(Continued)

*Primary Examiner* — Jason W Blust
(74) *Attorney, Agent, or Firm* — Fleit Intellectual Property Law; Thomas S. Grzesik

(57) ABSTRACT

Various embodiments manage dynamic memory allocation data. In one embodiment, a set of memory allocation metadata is extracted from a memory heap space. Process dependent information and process independent information is identified from the set of memory allocation metadata based on the set of memory allocation metadata being extracted. The process dependent information and the process independent information at least identify a set of virtual memory addresses available in the memory heap space and a set of virtual memory addresses allocated to a process associated with the memory heap space. A set of allocation data associated with the memory heap space is stored in a persistent storage based on the process dependent information and the process independent information having been identified. The set of allocation data includes the process independent allocation information and a starting address associated with the memory heap space.

20 Claims, 4 Drawing Sheets

(56) References Cited

U.S. PATENT DOCUMENTS

| | | |
|---|---|---|
| 8,312,242 B2 | 11/2012 | Casper et al. |
| 8,352,698 B2 | 1/2013 | Higuchi et al. |
| 9,195,593 B1 | 11/2015 | Radovic |
| 2004/0221120 A1 | 11/2004 | Abrashkevich et al. |
| 2010/0042800 A1 | 2/2010 | Jonnala et al. |
| 2015/0227414 A1 | 8/2015 | Varma |
| 2017/0242602 A1 | 8/2017 | Demchenko |

OTHER PUBLICATIONS

Sultan, F., et al., "Scalable Fault-Tolerant Distributed Shared Memory", Proceedings of the 2000 ACM/IEEE Converence on Supercomputing, Nov. 5-10, 2000, pp. 1-13.

Notice of Allowance of U.S. Appl. No. 14/98,411 dated Sep. 20, 2017.

List of IBM Patents or Patent Applications Treated as Related.

RESTORABLE MEMORY ALLOCATOR

BACKGROUND

The present disclosure generally relates to memory allocation within computing environments, and more particularly relates to a restorable memory allocator.

User-level programs are generally allocated memory from a dynamic memory pool referred to as a heap. As a program is allocated memory, the user-level memory allocator stores allocation metadata within the heap. This metadata describes the allocation status of the heap such as the free and unavailable memory. When the program terminates, the heap is reset and the allocation metadata is usually lost. Therefore, the allocation status of a heap is generally not restorable.

BRIEF SUMMARY

In one embodiment, a method for managing dynamic memory allocation data is disclosed. The method comprises extracting a set of memory allocation metadata from a memory heap space. Process dependent information and process independent information is identified from the set of memory allocation metadata based on the set of memory allocation metadata being extracted. The process dependent information and the process independent information at least identify a set of virtual memory addresses available in the memory heap space and a set of virtual memory addresses allocated to a process associated with the memory heap space. A set of allocation data associated with the memory heap space is stored in a persistent storage based on the process dependent information and the process independent information having been identified. The persistent storage can also be replicated to a different failure domain to ensure status recoverability in the event of process failure. The set of allocation data comprises the process independent allocation information and a starting address associated with the memory heap space.

In another embodiment, an information processing system for managing dynamic memory allocation data is disclosed. The information processing system memory and a processor that is operably coupled to the memory. The information processing system further comprises a restorable memory allocator. The restorable memory allocator is operably coupled to the memory and the processor, and is configured to perform a method. The method comprises extracting a set of memory allocation metadata from a memory heap space. Process dependent information and process independent information is identified from the set of memory allocation metadata based on the set of memory allocation metadata being extracted. The process dependent information and the process independent information at least identify a set of virtual memory addresses available in the memory heap space and a set of virtual memory addresses allocated to a process associated with the memory heap space. A set of allocation data associated with the memory heap space is stored in a persistent storage based on the process dependent information and the process independent information having been identified. The persistent storage can also be replicated to a different failure domain to ensure status recoverability in the event of process failure. The set of allocation data comprises the process independent allocation information and a starting address associated with the memory heap space.

In yet another embodiment, a computer program product for managing dynamic memory allocation data is disclosed. The computer program product comprises a storage medium readable by a processing circuit and storing instructions for execution by the processing circuit for performing a method. The method comprises extracting a set of memory allocation metadata from a memory heap space. Process dependent information and process independent information is identified from the set of memory allocation metadata based on the set of memory allocation metadata being extracted. The process dependent information and the process independent information at least identify a set of virtual memory addresses available in the memory heap space and a set of virtual memory addresses allocated to a process associated with the memory heap space. A set of allocation data associated with the memory heap space is stored in a persistent storage based on the process dependent information and the process independent information having been identified. The persistent storage can also be replicated to a different failure domain to ensure status recoverability in the event of process failure. The set of allocation data comprises the process independent allocation information and a starting address associated with the memory heap space.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Operating Environment

Figure 1:
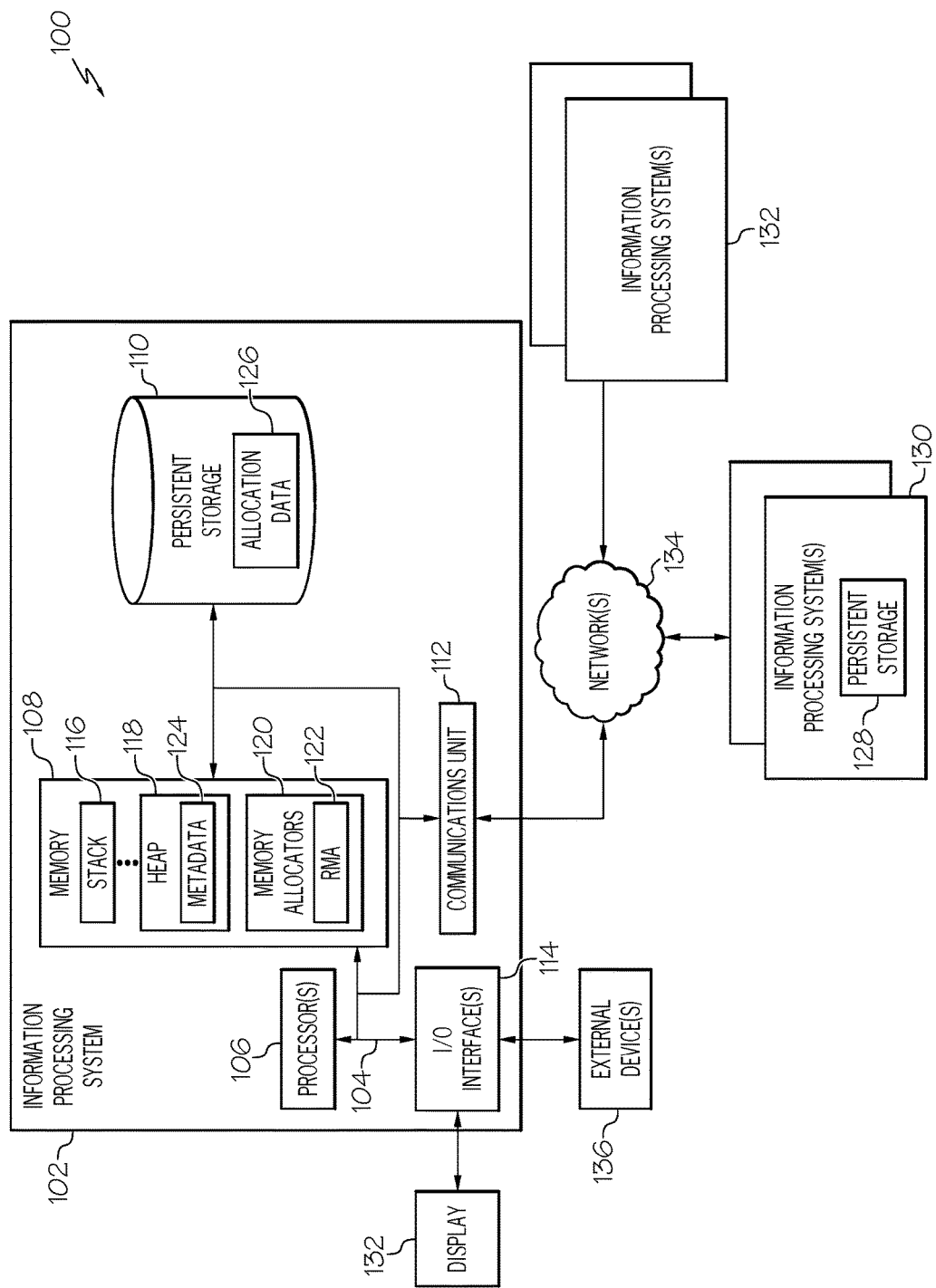
FIG. 1 is a block diagram illustrating one example of an operating environment according to one embodiment of the present disclosure.

FIG. 1 shows one example of an operating environment 100 implementing a restorable memory allocator architecture according to one embodiment of the disclosure. In particular, FIG. 1 shows an information processing system 102 that is based upon a suitably configured processing system adapted to implement one or more embodiments of the present disclosure. Similarly, any suitably configured processing system can be used as the information processing system 102 by various embodiments of the present disclosure. The system 102 can be a standalone system or reside within a multi-system environment such as a parallel-distributing environment.

The information processing system 102 comprises a communications fabric 104, which provides communications between computer processor(s) 106, memory 108, persistent storage 110, communications unit 112, and input/output (I/O) interface(s) 114. Communications fabric 104 can be implemented with any architecture designed for passing data and/or control information between processors (such as microprocessors, communications and network processors, etc.), system memory, peripheral devices, and any other hardware components within a system. For example, communications fabric 104 can be implemented with one or more buses.

The memory 108 and persistent storage 110 are computer-readable storage media. In this embodiment, the memory 108 includes volatile memory such as random access memory (RAM) and cache memory. However, the memory can include non-volatile memory as well. Portions of the memory 106 are designated as stack memory 116 and heap memory (also referred to herein as "heap space") 118, among others. The stack and heap memories 116, 118 comprise data created during the execution of application programs. An operating system (not shown) included in the memory 108 allocates a stack 116 for each system-level thread upon its creation, and allocates a heap memory 118 for application programs (processes). The heap memory 118 is utilized to dynamically allocate memory by way of virtual memory addresses to applications. Generally, data only exists within the heap memory 118 for as long as its associated process is executing. Once the process terminates the heap memory 118 is reset. The information processing system 102 utilizes conventional virtual addressing mechanisms to allow programs to behave as if they have access to a large, single storage entity, referred to herein as a computer system memory, instead of access to multiple, smaller storage entities such as the main memory and mass storage devices.

FIG. 1 also shows that the memory 108 comprises one or more memory allocators 120 that manage the allocation of memory to threads and user applications. In one embodiment, at least one memory allocator is a restorable memory allocator (RMA) 122. For example, the RMA 122 can restore itself and the memory allocation status by reading the allocation data, which is reliably stored in either a persistent storage or contains identical replicas at different machines. The restorable memory allocator 122 can be part of a user-level memory allocator or separate from a user-level memory allocator. In each instance, the RMA 122 operates in conjunction with the user-level memory allocator to preserve and restore the allocation state of the heap space 118. For example, the RMA 122 preserves allocation metadata 124 stored within the heap space 118 by storing allocation data 126 within local and/or external persistent storage 110, 128. In another embodiment, the allocation data 126 can be copied directly into the memory of information processing system(s) 130 using remote direct memory access (RDMA) operations. The allocation data 126 comprises at least a starting address associated with the heap memory 118 and process independent allocation information. The RMA 122 and the allocation data 126 are discussed in greater detail below.

The persistent storage 110 includes a magnetic hard disk drive. Alternatively, or in addition to a magnetic hard disk drive, the persistent storage 110 can include a solid-state hard drive, a semiconductor storage device, read-only memory (ROM), erasable programmable read-only memory (EPROM), flash memory, or any other computer-readable storage media that is capable of storing program instructions or digital information. The media used by the persistent storage 110 may also be removable. For example, a removable hard drive may be used for persistent storage 110. Other examples include optical and magnetic disks, thumb drives, and smart cards that are inserted into a drive for transfer onto another computer-readable storage medium that is also part of the persistent storage 110. It should be noted that in addition to local persistent storage 110, the system 102 is also able to utilize persistent storage 128 stored on one or more external information processing systems 130.

The communications unit 112, in these examples, provides for communications with other data processing systems or devices. For example, the communications unit 112 communicatively couples the system 102 to one or more additional information processing systems 130, 132 via one or more networks 134. In these examples, the communications unit 112 includes one or more network interface cards. The communications unit 112 may provide communications through the use of either or both physical and wireless communications links.

The I/O interface(s) 114 allows for input and output of data with other devices that may be connected to the system 102. For example, I/O interface 114 may provide a connection to external devices 136 such as a keyboard, keypad, a touch screen, and/or some other suitable input device. The external devices 136 can also include portable computer-readable storage media such as, for example, thumb drives, portable optical or magnetic disks, and memory cards. The I/O interface(s) 114 also connects to a display 138. The display 138 provides a mechanism to display data to a user and may be, for example, a computer monitor.

Restorable Memory Allocator

The memory 108 comprises a common pool of free memory, which is dynamically allocated and used by programs. This common pool of memory is, in one example, a range of virtual memory dynamically backed by physical memory, as needed. One example of this common pool of memory is the heap memory 118. Although the embodiments described herein refer to heap memory, one or more aspects of the present disclosure are applicable and usable with other types of dynamically allocated memory. Heap memory is only one example.

The heap memory is managed dynamically and in real-time by a memory manager or allocator. For example, when a process requests additional memory during its execution the memory allocator dynamically allocates memory to the process from its heap memory 118. In general, a memory allocator stores allocation data identifying the free and reserved areas of the heap memory, with the reserved areas being allocated portions of the memory. However, because heap memory resides within volatile memory when a process ends the heap memory resets and nothing persists in the heap memory from application execution to the next.

Therefore, one or more embodiments provide a restorable memory allocator 122 that persists allocation data 126 associated with heap memory. As will be discussed below, the RMA 122 stores memory allocation information 126 such that the RMA is able to memorize the previous allocation status of associated with a process before the process terminates; continue serving allocation requests from the previous allocation status as if there was no intermediate process termination; and provide portability (i.e., the memory allocation information maintained on a server by an RMA 122 can be easily interpreted by other processes regardless of their location). The RMA 122 maintains memory allocation for a process even after the process initializing the RMA 122 terminates.

Figure 2:
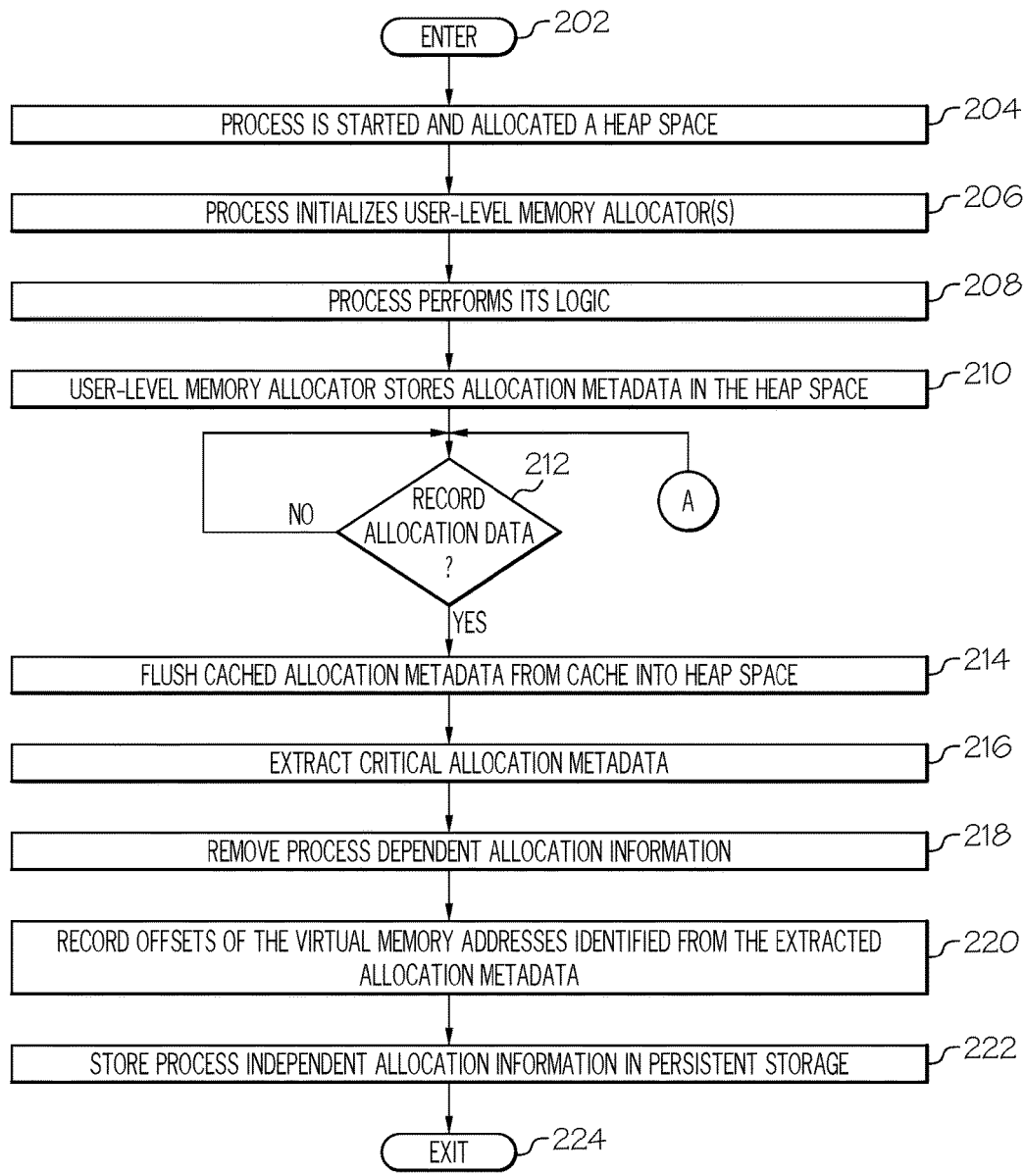
FIG. 2 is an operational flow diagram illustrating one process for managing memory allocation metadata for restorability according to one embodiment of the present disclosure.

FIG. 2 shows an operational flow diagram of an overall process performed by the RMA 122 for managing memory allocation metadata for restorability. The operational flow diagram of FIG. 2 begins at step 202 and flows directly to step 204. An application/process is started and a heap space 118 is allocated to the process by the operating system, at step 204. The process, at step 206, initializes its user-level memory allocator(s). The process, at step 208, performs its own logic (e.g., the applications conduct user-defined computation, which is unrelated to the memory allocation) and its user-level memory allocator allocates memory from the heap 118 to the process. The user-level memory allocator, at step 210, stores allocation metadata in the heap 118 describing the allocation states of the heap 118. In one embodiment, the memory allocation metadata is stored at the beginning of the heap 118.

Figure 3:
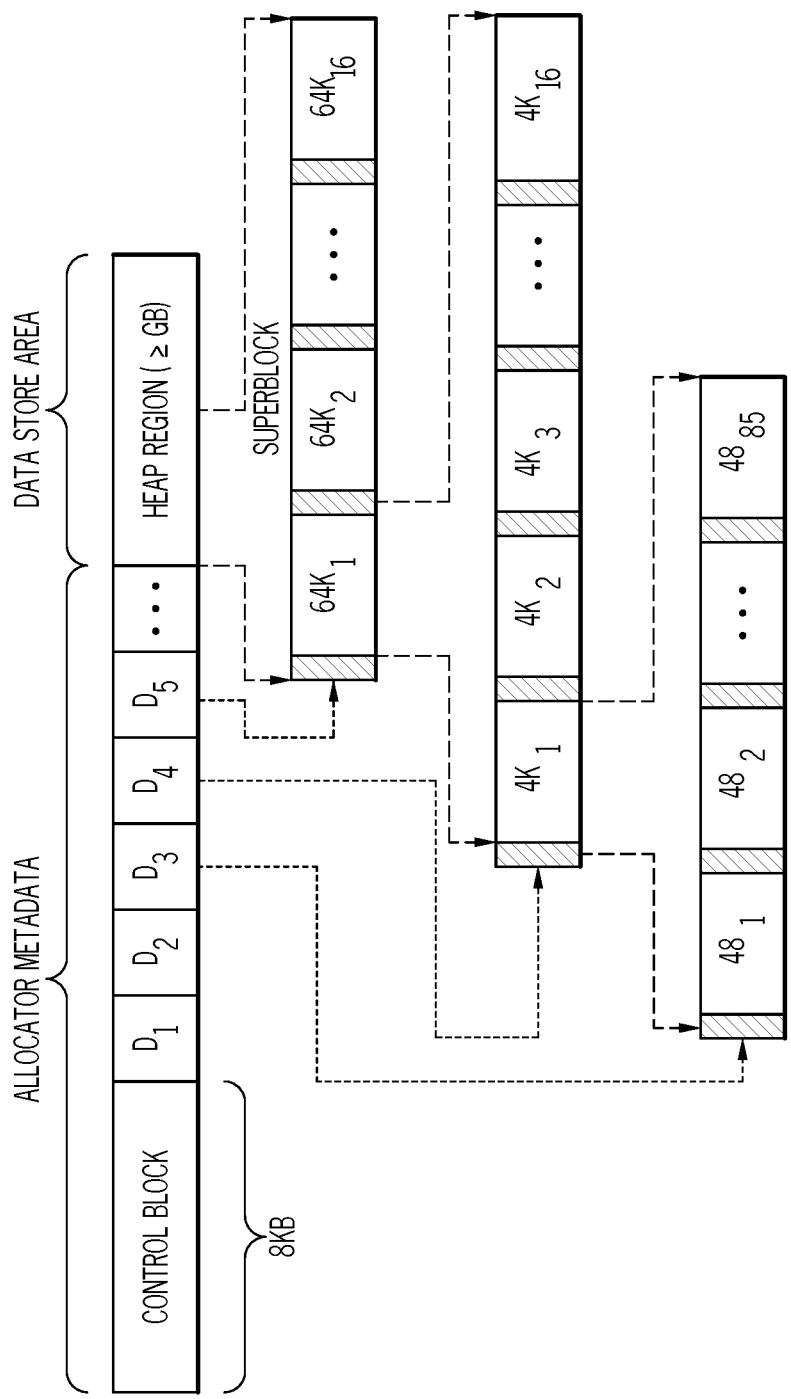
FIG. 3 shows one example of memory allocation metadata generated by a user-level memory allocator.

For example, consider a Lock-Free Memory Allocator (LFMA). LFMA maintains the allocation metadata at the beginning of the heap to enable the region to be self-descriptive. As illustrated in FIG. 3, the LFMA initially uses the first 1 MB memory for ControlBlock and an array of Descriptors. ControlBlock outlines the usage of the entire region, such as the amount of available memory and the head that links to the first available descriptor. Though a descriptor (128 bytes) is designed for a variety of purposes, it is mainly used to manage a group of memory chunks of the same size (i.e., Sizeclass). Upon receiving an allocation request, if the required size falls into the range that still contains free memory chunks, the allocator supplies a chunk and modifies the corresponding descriptor to link it to the next available chunk within the group. Taking the example shown in FIG. 3, when a request for a 4 KB chunk arrives, if $4K_2$ is the first free chunk, the allocator then returns the chunk and modifies the descriptor $D_4$ to make it point to $4K_3$. When there is no available chunk to satisfy the incoming request, the allocator needs to carve out a large piece of memory, called Superblock, from the remaining heap region and assign a new descriptor to manage it. Such a superblock is then hierarchically partitioned and formatted to reach a sizeclass that satisfies the requested size, as shown in FIG. 3. Throughout this operation, the status of many descriptors can be changed along with the ControlBlock.

The RMA 122, at step 212, determines if the memory allocation metadata is to be recorded. For example, the RMA 122 can be configured to record the metadata in an on-demand or automatic manner. For example, each time the user-level memory allocator stores or updates allocation metadata in the heap space 118 the RMA 122 determines that a record operation is to be performed. Alternatively, the RMA 122 can determine that a record operation is to be performed based on a given interval of time having passed since the last record operation was performed. On-demand recording can be triggered by, for example, calling the function provided by the restorable memory allocator. For automatic recording, the interval can be either user defined, or the interval can be dynamically determine based on how much the allocation status has been changed.

If the result of this determination is negative, the RMA 122 continues its determination process. If the result of this determination is positive, the RMA 122 flushes cached allocation metadata from cache into the heap space 118, at step 214. This ensures that the allocation metadata within the heap 118 reflects the last update operation. It should be noted that in the case that only 1 CPU core is making changes to the memory allocation status, the up-to-date allocation status may be cached in L1 or L2 caches. The cache is flushed to ensure that the heap comprises the latest version of allocation status. Most operating systems provide APIs to flush the caches. When metadata is ready by the CPU core again, the metadata can be moved to the cache. If the CPU does not read the metadata the metadata does not need to be actively moved from heap to cache.

The RMA 122, at step 216, then extracts critical allocation metadata such the starting address associated with the heap, references or pointers to available (free) and unavailable (allocated) from the heap memory 118, available and unavailable virtual addresses, and/or the like. In an example where the metadata was created by an LFMA, the RMA 122 extracts information associated with the super-blocks and control-block. The RMA 122, at step 218, then removes all process dependent allocation information (e.g., references, pointers, etc.) except for the starting addresses.

The RMA 122, at step 220, records the offsets (with respect to the starting address) of the virtual memory addresses identified from the extracted allocation metadata. The RMA 122 records the offsets as compared to the absolute virtual memory addresses to that when the heap space is copied into a different heap space of the same size. An RMA can continue to function on the new heap space as before based on the new starting address of the new heap space. Therefore, the allocation data recorded by the RMA 122 does not comprise any process-dependent information except for the starting address of the memory area associated with the heap 118. The recoded allocation data at least identifies the starting address of the memory associated with the heap 118, how much memory has been allocated to the process associated with the heap 118, the allocated memory, and the available memory. The RMA 122 then stores process independent allocation information in local or remote persistent storage 110, 128 or replicated into a difference failure domain, at step 222. The process independent allocation information comprises at least the offsets of available and unavailable virtual memory addresses, and the starting address associated with the heap space 118. The control flow then exists at step 224.

Figure 4:
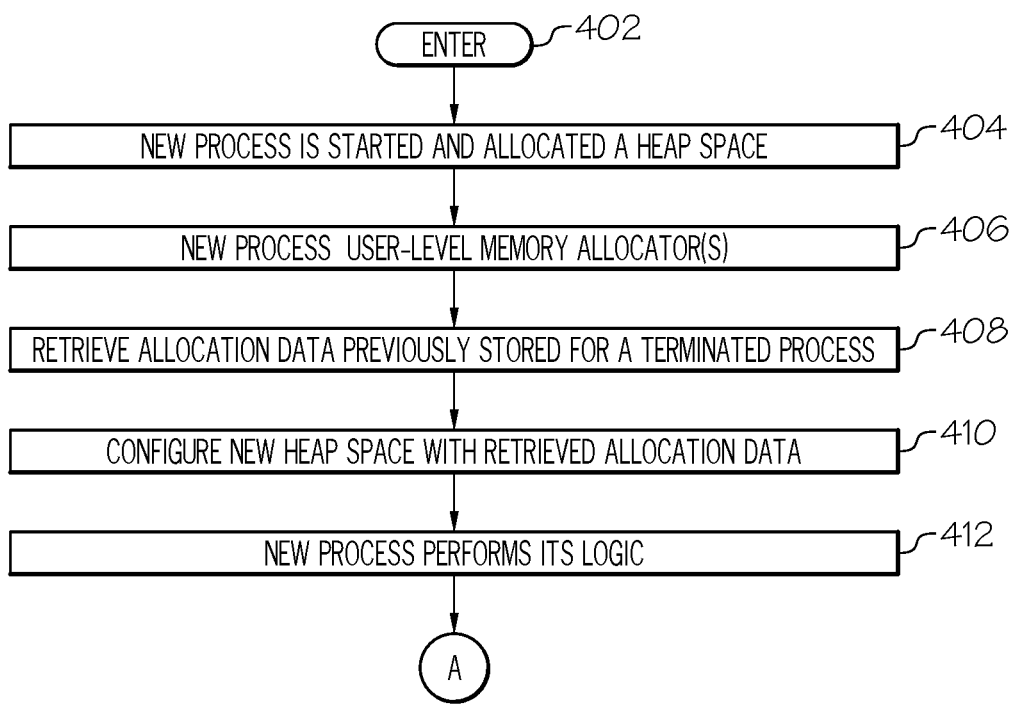
FIG. 4 is an operational flow diagram illustrating one process for restoring the allocation state of a dynamic memory.

The persisted or replicated allocation data can then be restored by the RMA 122 or another RMA as needed. For example, FIG. 4 shows an operational flow diagram of an overall process performed by the RMA 122 for restoring the allocation state of a heap. For example, during migration of a process from a heavily overloaded machine to a machine with less load, the memory allocation status of the process at the previous machine is restored on the new machine. The process begins at step 402 and flows directly to step 404. A new process is started on the system 102 or another system 130 and a heap space 118 is allocated to the process by the operating system, at step 404. The process, at step 406, initializes its user-level memory allocator(s). The RMA 122, at step 408, retrieves allocation data persisted or replicated to reliable storage for a heap space of a previously terminated process. The RMA 122 can be configured with information regarding where allocation status is stored. Also, stored allocation status data can be time stamped so that the RMA 122 knows which version to retrieve.

Once the RMA has retrieved the allocation data, the RMA 122 configures the heap space allocated for the new process based on the retrieved allocation data, at step 410. For example, the retrieved allocation information is stored within the heap space so that the user-level allocator can serve memory allocation requests as if the previous process did not terminate. In other words, memory is allocated to the process based on the memory that was available and unavailable to the previous process. This is made possible because the retrieved allocation information comprises process-independent information. In particular, the retrieved allocation information comprises the starting address associated with the heap space of the previously terminated process and the offsets of the available/unavailable memory. With retrieved allocation data, the RMA 122 allocates a new memory heap and copies the content from a well-known place into the memory. If the memory space has already been reserved, then the copy phase may be unnecessary. In addition, the RMA 122 restores the allocation status by reading the allocation data. Once the RMA 122 restores its previous allocation status, it can continue serving the allocation requests by using traditional memory allocation method, such as using bitmap-based allocation or linked-list based approach. The new process, at step 412, performs its logic and the control flows to entry point A of FIG. 2.

The RMA 122 can be implemented and utilized in various computing environments. For example, the RMA 122 can be implemented in general computing environments where heap space images need to be persisted or replicated, or in more specialized environments such as those implementing in-memory key value stores (IMKVs), memory check-pointing, data replication conducted by remote direct memory access (RDMA), and/or the like. With respect to IMKVs, the RMA 122 can be utilized to provide fast and efficient migration and replication of the IMKVs. In particular, the RMA 122 allows for IMKVs to achieve high availability while preserving their high performance characteristics. IMKVs maintain their data within the main memory of their system, as compared to persistent storage. An IMKV store writes a value by associating a key to the value and reads a value by specifying a key associated with the value. The data is maintained within a map stored in the heap memory, where the map is a data structure that stores pairs of keys and values. When given a key, a map can locate the corresponding entry that includes its paired value. If the system implementing the IMKV fails, the data is lost since it is stored in volatile memory. Therefore, migration and replication of the IMKV is essential in these systems.

When it becomes time for a storage process to migrate key-values stored in the heap to another remote process the RMA 122 allows the entire heap space to be copied in a single operation as compared to iterating over all the items and conducting multiple copies when a large portion of the heap is consumed. Without RMA, each key-value replication needs to respect the key-value boundary. Therefore, when several key-value pairs locate at a continuous memory region, they cannot be copied to the new process together because the memory allocation status cannot be maintained. They have to be copied one by one and, as a result, the number of I/O is equal to the number of key-value pairs stored in the memory. However, one or more embodiments, allow a single I/O request to copy the entire memory region, which may include a large number of key-value pair. With the help of RMA, embodiments do not need to respect the key-value boundary. Instead, various embodiments, only need to respect the heap space boundary.

Regarding replication, RDMA-based operations can be utilized in IMKVs to bypass the operating system for directly copying IMKV data from the user-space memory (i.e., heap) to that of a remote side without requiring CPUs on both sides to participate in the data movement. For example, RDMA-Write can be utilized to accelerate message passing and RDMA-Read can be used to further speed up read operations when the workloads exhibit strong temporal locality. In one embodiment, not only is the key-value data can be replicated over to a remote system utilizing RDMA but also the allocation data 126 discussed above. The allocation data 126 can comprise, for example, a pool of pre-allocated HashTable entries, each of which has a fixed size of 64 bytes and contains critical information describing the key-value pair such as the memory address and hash code, etc.

Non-Limiting Embodiments

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer maybe connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method, by an information processing system, comprising
    extracting a set of memory allocation metadata from a memory heap space;
    identifying, based on the extracting, process dependent information and process independent information from the set of memory allocation metadata, the process dependent information and the process independent information at least identifying a set of virtual memory addresses available in the memory heap space and a set of virtual memory addresses allocated to a process associated with the memory heap space; and
    at least one of
        storing, based on identifying the process dependent information and process independent information, a set of allocation data associated with the memory heap space in a persistent storage, and
        replicating, based on identifying the process dependent information and process independent information, the set of allocation data to a different failure domain, wherein the set of allocation data comprises the process independent allocation information and a starting address associated with the memory heap space.

2. The method of claim 1, wherein the process dependent information comprises at least one of a set of pointers and a set of references to the set of available virtual memory addresses and the set of virtual memory addresses allocated to the process.

3. The method of claim 1, wherein process independent information comprises an offset of each virtual memory address in the set of available virtual memory addresses and the set of virtual memory addresses allocated to the process.

4. The method of claim 1, wherein the set of memory allocation metadata is extracted from the memory heap space in response to detecting a change to the set of memory allocation metadata.

5. The method of claim 1, wherein the process independent information stored in the set of allocation data is interpretable by another process.

6. The method of claim 1, further comprising:
after the process terminates, determining that a new memory heap space has been allocated to a new process;
retrieving the set of allocation data that has been stored for the memory heap space; and
configuring, based on the retrieving, the new memory heap space based on the set of allocation data.

7. The method of claim 6, further comprising:
satisfying, from the new memory heap based on the configuring, memory allocation requests for the new process according to the set of virtual memory addresses available in the memory heap space and the set of virtual memory addresses allocated from the memory heap prior to the process terminating.

8. An information processing system comprising:
a memory;
a processor communicatively coupled to the memory; and
a restorable memory allocator communicatively coupled to the memory and the processor, the restorable memory allocation configured to perform a method comprising:
extracting a set of memory allocation metadata from a memory heap space;
identifying, based on the extracting, process dependent information and process independent information from the set of memory allocation metadata, the process dependent information and the process independent information at least identifying a set of virtual memory addresses available in the memory heap space and a set of virtual memory addresses allocated to a process associated with the memory heap space; and
at least one of
storing, based on identifying the process dependent information and process independent information, a set of allocation data associated with the memory heap space in a persistent storage, and
replicating, based on identifying the process dependent information and process independent information, the set of allocation data to a different failure domain,
wherein the set of allocation data comprises the process independent allocation information and a starting address associated with the memory heap space.

9. The information processing system of claim 8, wherein the process dependent information comprises at least one of a set of pointers and a set of references to the set of available virtual memory addresses and the set of virtual memory addresses allocated to the process.

10. The information processing system of claim 8, wherein process independent information comprises an offset of each virtual memory address in the set of available virtual memory addresses and the set of virtual memory addresses allocated to the process.

11. The information processing system of claim 8, wherein the process independent information stored in the set of allocation data is interpretable by another process.

12. The information processing system of claim 8, wherein the method further comprises:
after the process terminates, determining that a new memory heap space has been allocated to a new process;
retrieving the set of allocation data that has been stored for the memory heap space; and
configuring, based on the retrieving, the new memory heap space based on the set of allocation data.

13. The information processing system of claim 12, wherein the method further comprises:
satisfying, from the new memory heap based on the configuring, memory allocation requests for the new process according to the set of virtual memory addresses available in the memory heap space and the set of virtual memory addresses allocated from the memory heap prior to the process terminating.

14. A computer program product comprising comprises a storage medium readable by a processing circuit and storing instructions for execution by the processing circuit for performing a method, the method comprising:
extracting a set of memory allocation metadata from a memory heap space;
identifying, based on the extracting, process dependent information and process independent information identifying from the set of memory allocation metadata, the process dependent information and the process independent information at least identifying a set of virtual memory addresses available in the memory heap space and a set of virtual memory addresses allocated to a process associated with the memory heap space; and
at least one of
storing, based on identifying the process dependent information and process independent information, a set of allocation data associated with the memory heap space in a persistent storage, and
replicating, based on identifying the process dependent information and process independent information, the set of allocation data to a different failure domain, wherein the set of allocation data comprises the process independent allocation information and a starting address associated with the memory heap space.

15. The computer program product of claim 14, wherein the process dependent information comprises at least one of a set of pointers and a set of references to the set of available virtual memory addresses and the set of virtual memory addresses allocated to the process.

16. The computer program product of claim 14, wherein process independent information comprises an offset of each virtual memory address in the set of available virtual memory addresses and the set of virtual memory addresses allocated to the process.

17. The computer program product of claim 14, wherein the set of memory allocation metadata is extracted from the memory heap space in response to detecting a change to the set of memory allocation metadata.

18. The computer program product of claim 14, wherein the process independent information stored in the set of allocation data is interpretable by another process.

19. The computer program product of claim 14, wherein the method further comprises:
after the process terminates, determining that a new memory heap space has been allocated to a new process;
retrieving the set of allocation data that has been stored for the memory heap space; and
configuring, based on the retrieving, the new memory heap space based on the set of allocation data.

20. The computer program product of claim 19, wherein the method further comprises:

satisfying, from the new memory heap based on the configuring, memory allocation requests for the new process according to the set of virtual memory addresses available in the memory heap space and the set of virtual memory addresses allocated from the memory heap prior to the process terminating.

\* \* \* \* \*